United States Patent
Ryu et al.

(10) Patent No.: US 10,552,870 B1
(45) Date of Patent: Feb. 4, 2020

(54) PRIVACY-SAFE FREQUENCY DISTRIBUTION OF GEO-FEATURES FOR MOBILE DEVICES

(71) Applicant: Quantcast Corporation, San Francisco, CA (US)

(72) Inventors: Eunsu Ryu, San Francisco, CA (US); Sean Huang, San Francisco, CA (US); Tong T. Pham, San Francisco, CA (US); Joshua A. Job, San Francisco, CA (US)

(73) Assignee: Quantcast Corporation, San Francisco, CA (US)

( * ) Notice: Subject to any disclaimer, the term of this patent is extended or adjusted under 35 U.S.C. 154(b) by 775 days.

(21) Appl. No.: 15/199,704

(22) Filed: Jun. 30, 2016

(51) Int. Cl.
G06Q 30/02 (2012.01)
H04W 4/02 (2018.01)

(52) U.S. Cl.
CPC ..... *G06Q 30/0261* (2013.01); *G06Q 30/0267* (2013.01); *G06Q 30/0275* (2013.01); *H04W 4/023* (2013.01)

(58) Field of Classification Search
CPC .................................................. G06Q 30/02
See application file for complete search history.

(56) References Cited

U.S. PATENT DOCUMENTS

| | | | | |
|---|---|---|---|---|
| 8,862,534 B1 * | 10/2014 | Faratin | ................... | G06Q 30/02 706/50 |
| 2007/0143260 A1 * | 6/2007 | Markov | ................. | G06Q 30/02 |
| 2009/0055268 A1 * | 2/2009 | Knoller | ................... | G06Q 30/02 705/14.61 |
| 2010/0057560 A1 * | 3/2010 | Skudlark | ................ | G06Q 30/02 705/14.49 |
| 2010/0146583 A1 * | 6/2010 | Prehofer | ................ | G06Q 10/10 726/1 |
| 2011/0099046 A1 * | 4/2011 | Weiss | ...................... | G06Q 10/00 705/7.31 |
| 2011/0258049 A1 * | 10/2011 | Ramer | ................... | G06Q 30/02 705/14.66 |
| 2011/0289090 A1 * | 11/2011 | Zhou | ...................... | G06O 30/02 707/740 |
| 2012/0130796 A1 * | 5/2012 | Busch | .................... | G06Q 30/02 705/14.36 |
| 2016/0063475 A1 * | 3/2016 | Yule | ................... | G06Q 20/3224 705/39 |

* cited by examiner

*Primary Examiner* — Vincent M Cao
(74) *Attorney, Agent, or Firm* — Robin W. Reasoner; Andrea Wheeler

(57) ABSTRACT

A mobile device's location and identifier corresponding to the mobile device is received. The mobile device's location is mapped to a plurality of landmarks proximate to the mobile device's location. The proximate landmarks are stored in association with the mobile device's identifier in a geo data store, and the received location data is then discarded. These steps are iterated over time to build up a data store that can be represented as a frequency distribution of the landmarks that surround mobile devices. Such a frequency distribution can be built for each of a plurality of mobile devices, without maintaining records of any mobile device's location.

18 Claims, 5 Drawing Sheets

PRIVACY-SAFE FREQUENCY DISTRIBUTION OF GEO-FEATURES FOR MOBILE DEVICES

BACKGROUND

Technical Field

This invention pertains in general to mobile devices and in particular to control systems for advertisement distribution responsive to a frequency distribution of geo-features in the vicinity of the mobile device.

Description of Related Art

In order to realize the best return on investment, advertisers often use geographic criteria to target advertisements. For example, if a particular retail store is found only in a particular city, the retailer may seek opportunities to advertise to people who work or reside in that particular city, judging them to be more likely to be influenced to shop at the retail store than those who work and reside in distant geographic regions. In fact, an advertiser for the retail store may especially want to advertise to people who spend a lot of time near the retail store, because those people have greater opportunities to shop at the retail store than those who spend their time living and working on the other side of the city.

However, consumers have widely varying comfort levels with disclosing their precise locations, even on an anonymous and/or time-delayed basis. Some people are wary of allowing companies to maintain records of where they have been, regardless of the purpose for storing the information. The desire for advertisers to know where individuals spend time must be balanced against the desire of consumers to maintain their privacy and their personal safety.

SUMMARY

Embodiments of the invention include a system, a method, and a non-transitory computer-readable storage medium for developing a frequency distribution of geo-features surrounding a mobile device over time, without maintaining logs of a mobile device's location. A mobile device's location and identifier corresponding to the mobile device is received. The mobile device's location is mapped to a plurality of landmarks proximate to the mobile device's location. The proximate landmarks are stored in association with the mobile device's identifier in a geo data store, and the received location data is then discarded. These steps are iterated over time to build up a data store that can be represented as a frequency distribution of the landmarks that surround mobile devices. Such a frequency distribution can be built for each of a plurality of mobile devices, without maintaining records of any mobile device's location.

Meanwhile, the same mobile devices are also being used by users to access mobile applications including web browsers. As users undertake their normal activities on their mobile devices, data for some media consumption events is reported to a pixel data store. Then, the data from the geo data store and the data from the pixel data store are separately featurized.

In one embodiment, an advertising campaign can specify the geo features and pixel data features of interest for targeting advertisements. A training set of records can be identified for training the geo model and the pixel model to predict which mobile devices are more likely to convert as compared to the standard population or control group. Alternatively, an advertising campaign may select a group of records to use as a training set for the geo model trainer and pixel data model trainer. The geo model trainer and the pixel data model trainer respectively train models that assess the similarity of a record corresponding to a mobile device's unique identifier to an advertiser's target audience, such as previous converters. The trained models are combined into a meta model that is stored in a modeling server. The meta model is applied, for example, in a real-time bidding environment of an ad exchange, to determine an amount to bid on an opportunity to display an ad on a mobile device.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Embodiments of the invention provide the ability to develop a privacy-safe frequency distribution of what surrounds a mobile device over time, without storing the mobile device's history of locations. Such geo-features can be modeled and used in combination with website visitation data models to create a meta model. The meta model can be applied to a record associated with a mobile device to determine how much to bid for an opportunity to display an ad on the mobile device. Thus, the desire of advertisers to know where consumers spend time is balanced against the desire of consumers to maintain their privacy and their personal safety. An advertiser can make advertising spend decisions to reach their target audience without knowing a mobile device's history of locations.

Embodiments of the invention are described below in the context of a real-time bidding advertising exchange for opportunities to display advertisements to users through their web browsers. It is noted that similar techniques as those described below can be used in targeting advertisements in the context of other kinds of auctions and exchanges systems, for use with browser-based advertisements or other types of networked media as well. Such techniques are particularly useful where rapid decisions regarding advertisement opportunities are desirable.

Figure 1:
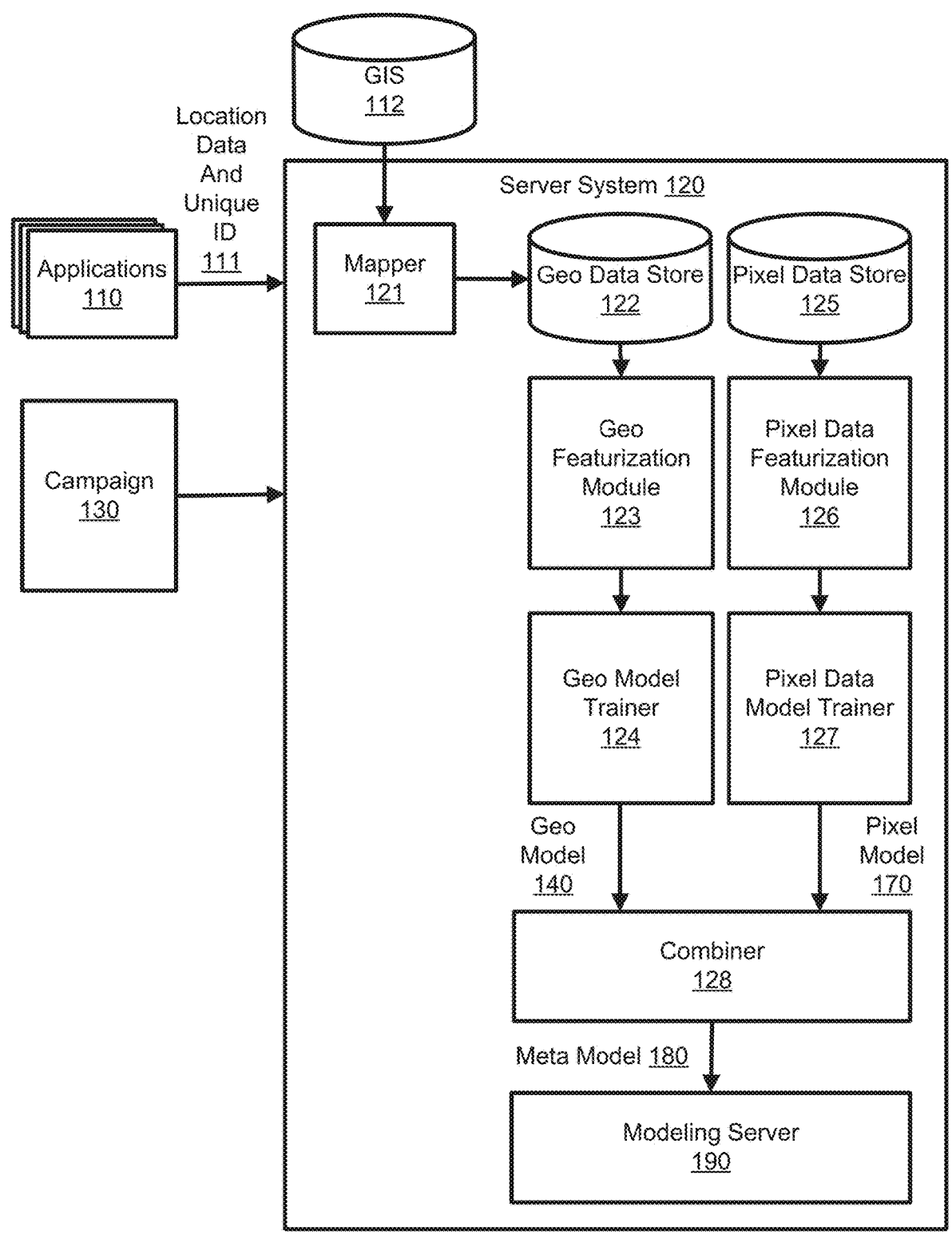
FIG. 1 is a high-level block diagram of a computing environment of a server system for building a model, in accordance with an embodiment of the invention.

FIG. 1 is a high-level block diagram of a computing environment of a server system 120 for building a meta model 180, in accordance with an embodiment of the invention. The computing environment includes applications 110, a geographic information system 112, at least one campaign 130, and a server system 120.

The applications 110 are software applications such as global positioning system applications, entertainment applications, retail applications, social media applications, and web browsers executing on users' mobile devices, such as mobile computers, tablet computers, and smartphones. As users undertake their normal use of the applications 110, in one embodiment, data 111 is reported from the applications 110 on the mobile devices to the server system 120.

The data 111 includes location data and a unique identifier for the respective mobile device. A variety of methods exist for associating an anonymous identifier with a mobile device. For example, a hardware device identifier such as a Media Access Control Address (MAC address) which can be stored on a device operated by a user to access content over a network. As another example, a software identifier such as a cookie value can be locally stored. In other embodiments, identifiers can be composed and/or stored remotely from a device associated with the user. In some cases, a mobile device can have multiple identifiers, such as multiple first party cookies and multiple third party cookies, which can be used to identify the device to various systems. A direct measurement system can collect and/or receive information for an application or a system in conjunction with the identifier. In some cases, information collected and/or received by the direct measurement system can be processed before it is stored. For example, when a browser requests content from a content provider, the content provider can re-direct the browser to submit a pixel request to the direct measurement system. Based on the pixel request, and optional subsequent actions and/or interactions, the direct measurement system can collect and/or receive information from the browser in conjunction with an identifier in order to enable the maintenance of a coherent body of information, such as a consumption history, over time. The consumption history can include websites visited, online purchases made, videos accessed, and a variety of other consumption events. In some cases, media consumption events are also reported to the server system 120 as part of the data 111.

The geographic information system 112 supplies geo data that indexes latitude and longitude locations to landmarks (such as parks, beaches, schools, etc.) and businesses (such as restaurants, shops, movie theaters, etc.). As known to those of skill in the art, there are several suitable geographic information systems commercially available for geo-referencing purposes. In some instances, rather than unique place names and proper names of businesses, a category of the landmark or business may be used instead to provide a further level of privacy.

The campaign 130 is an advertising campaign for which a model for targeting advertisements is to be built. The campaign provides a definition of a conversion to the server system 120. The definition of a conversion may be individually set by the campaign manager as an indication of what counts as a success of the campaign. For example, the definition of a conversion for one campaign may be a click-through to a particular website, while the definition of a conversion for another campaign may be a product purchase event, and the definition of a conversion for yet another campaign may be the completion of a registration form. In one embodiment, the definition of conversion is made with reference to an observable media consumption event. Thus, by analyzing consumption history data, converters can be distinguished from non-converters. In one variation, a campaign 130 may also send a definition of non-converters (e.g., defining non-converters as visitors to a website that did not purchase a product, versus defining a non-converter as not having met the definition of conversion), and/or other attributes to use to filter the data stream before building the model. Moreover, the campaign 130 may also provide other campaign constraints for use in operating the campaign, such as the campaign budget, exposure limitations, or the like.

The server system 120 receives the location data and unique identifier 111 from the applications 110, receives the geo data from the GIS 112, and receives the definition of conversion and any campaign constraints from the campaign 130. The server system 120 uses these inputs to build a model for use in targeting advertisements. The server system 120 includes a mapper 121, a geo data store 122, a geo featurization module 123, a geo model trainer 124, a pixel data store 125, a pixel data featurization module 126, a pixel data model trainer 127, a combiner 128, and a modeling server 190.

The mapper 121 uses the received location data 111 and the geo data from the GIS 112 to map the reported location to a set of proximate landmarks to that location within a threshold distance, for example, a half city block, a few hundred meters, or another suitable threshold. Each location may result in a plurality of proximate landmarks, such as a bookstore, a coffee shop, and a museum all within a radius of 200 meters of a location. The mapper 121 passes the proximate landmarks and the corresponding unique identifier of the mobile device to the geo data store 122 and discards the received location data 205. Thus, the server system 120 does not maintain a record of the latitude and longitude where the mobile device reported being.

The geo data store 122 stores the record of the proximate landmarks by unique identifier. In this way, the geo data store 122 builds up a repository of data reflective of what has surrounded the mobile device at each point that the mobile device reported its location through the location data 111. In one embodiment, this repository of data is stored as a histogram by category of landmark. Each additional point of location data 111 that is processed for a given unique identifier of a mobile device is capable of adding one or more counts in the histogram corresponding to that mobile device. Over time, the geo data store 122 builds a frequency distribution that demonstrates how often the mobile device is within the threshold distance of any of the categories of landmarks, without revealing anyone's precise location nor the timing of a visit.

Figure 4:
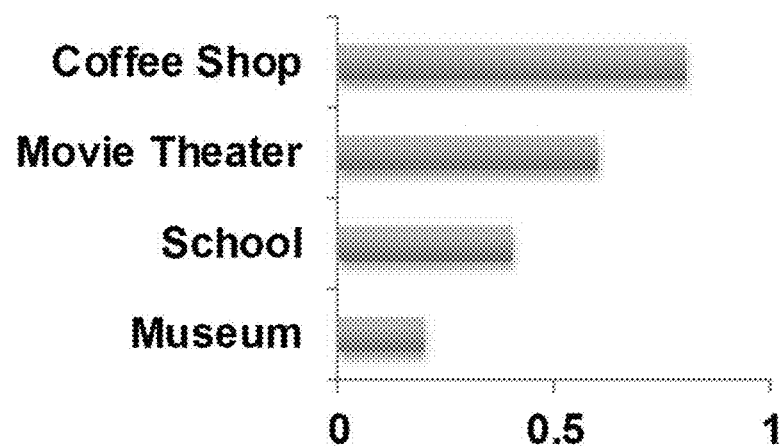
FIG. 4 is an example privacy-safe frequency distribution of geo-features that surround an example mobile device.

The geo featurization module 123 analyzes the record of proximate landmarks stored in the geo data store 122, scales and processes landmark frequencies, and featurizes the results for model training. For example, the record of proximate landmarks may include frequency of the appearance of each of a plurality of landmarks, such as schools, movie theaters, different types of businesses and the like. For example, such frequencies may be translated into rough percentages of the observations made that the mobile device is within a threshold distance of each of the plurality of landmark categories by dividing the count in the landmark category by the total number of observations. For example, one mobile device may be near a coffee shop 80% of the time, near a movie theater 60% of the time, near a school 40% of the time, near a museum 20%, and so on. An example privacy-safe frequency distribution of geo features proximate to a sample mobile device is illustrated in FIG. 4. Such an example mobile device may also be near a library 15% of the time, near a bank 10% of the time, etc.

The geo model trainer 124 trains the geo model using the featurized landmarks. In one embodiment, the geo model trainer identifies a training set of records that correspond to converters and another set of records that correspond to non-converters, for example, with reference to the definition of conversion supplied by the campaign 130. The geo model trainer 124 attaches geo features from the records of the converters and non-converters and trains the model to identify the features that are most strongly correlated to the status of a converter or non-converter, respectively. Once training is complete, the geo model trainer 124 estimates the parameters used to construct the underlying model. In one example, the parameters are the weights of each feature corresponding to the importance of the feature in predicting the likelihood of conversion. The geo model trainer 124 outputs the geo model 140 after training. This model can predict the likelihood that another mobile device will convert based on the presence or absence of geo features in the record corresponding to the mobile device by assessing the similarity of the mobile device's record of geo features compared to converters versus non-converters.

The pixel data store 125 stores media consumption events in conjunction with the identifier sent to the server system 120 in the data 111. In FIG. 1, the pixel data store 125 is shown as internal to the server system 120, but in other implementations, the pixel data store 125 may be external to or remote from the server system 120. Also, only one instance of the pixel data store 125 is shown in FIG. 1 for clarity, but in practice, the consumption histories may be stored in a plurality of data stores, such as a distributed network of storage facilities.

The pixel data featurization module 126 analyzes the record of pixel data stored in the pixel data store 125 and featurizes the data by translating the consumption history into a set of many features. For example, the features of a consumption history may include websites visited, keyword searches entered, online purchases made, topics from past ad opportunities, type of browser, etc.

The pixel data model trainer 127 trains the pixel model using the features of the data translated by the pixel data featurization module 126. In one embodiment, the pixel model trainer 127 identifies a training set of records that correspond to converters and another training set of records that correspond to non-converters, for example, according to the definition of conversion provided by the campaign 130. These sets of records may be the same or different from the sets used by the geo model trainer 124 described above. The pixel data model trainer 127 attaches features from the consumption histories of the converters and non-converters and trains the model to identify the features that are most strongly correlated to the status of a converter or non-converter, respectively. Each attached feature is assigned a weight by the pixel data model trainer 127. The pixel data model trainer 127 outputs the pixel model 170 after training. This model can predict the likelihood that another mobile device will convert based on the presence or absence of pixel data features in the record corresponding to the mobile device by assessing the similarity of the mobile device's record of pixel data compared to converters versus non-converters.

The combiner 128 combines the trained geo model 140 with the trained pixel model 170, for example by combining the features of both models. In one embodiment, the combiner 128 trains a meta model 180 to determine the respective weight to apply to each feature in the meta model 180. The combiner 128 outputs a trained meta model 180 to the modeling server 190.

The modeling server 190 stores the received meta model 180 for use in targeting advertisements for the campaign 130. The operation of the modeling server in using the meta model 180 to bid on advertisement opportunities for a mobile device is described below with reference to FIG. 3.

For clarity, FIG. 1 has illustrated only one instance of a campaign 130, and only one instance of a server system 120. In practice, many campaigns may be simultaneously active, and models may be built for each of them. Moreover, for any one campaign, to take advantage of parallel processing, and for speed in developing and updating models, data may be split and diverted to multiple server systems 120, each building a model from the converter and non-converter histories that have been routed to it. For example, the model can optionally be separately built and updated on multiple servers, for example each located in relative proximity to an advertising exchange, in order to support bidding on advertising opportunities in a real-time bidding environment. Even in instances where the models are built separately, periodically, the models may be synchronized, reconciled, or combined, for example every few hours or at the end of the day, or on another schedule, to prevent them from diverging too greatly, and to ensure that all models are benefiting from recent improvements to the models. In other embodiments, the models are not combined, in order to preserve the existence of differing trends experienced by subsets of the dispersed servers.

Figure 2:
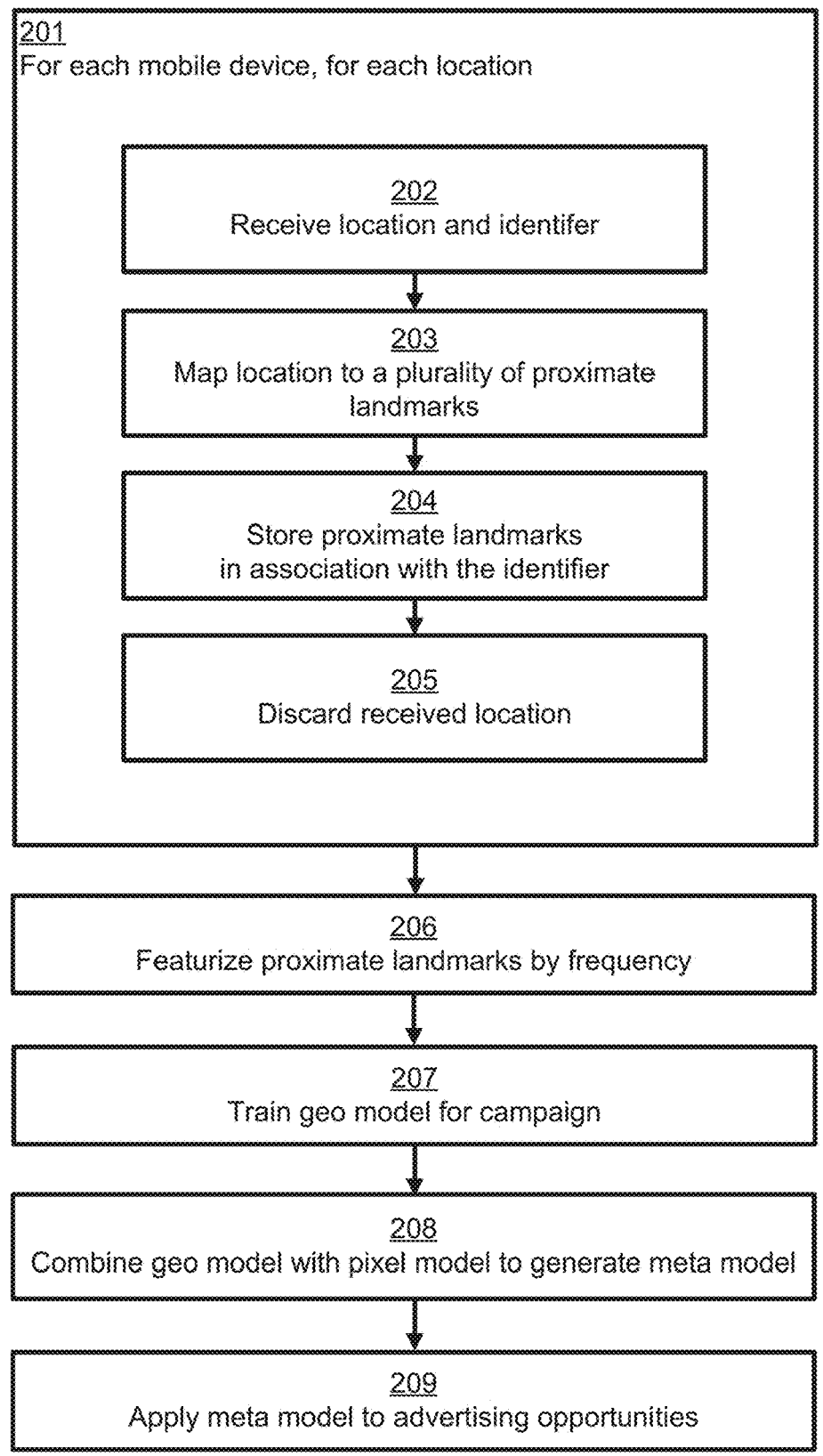
FIG. 2 is a flow chart illustrating a method of determining an amount to bid on an opportunity to display an ad on a mobile device, in accordance with an embodiment of the invention.

FIG. 2 is a flow chart illustrating a method of determining an amount to bid on an opportunity to display an ad on a mobile device, in accordance with an embodiment of the invention. In some implementations, the steps are performed in an order other than the order presented in FIG. 2, and in other implementations, additional or alternative steps may be performed.

In step 201, it is noted that steps 202-205 are iterated for each mobile device of a plurality of mobile devices for each of a plurality of locations, in order to build a frequency distribution of proximate landmarks for each of the plurality of mobile devices that report data 111 to the server system 120. In some cases, this involves iterating steps 202-205 many thousands of times for locations of each of many millions of mobile devices.

In step 202, a location and an identifier 111 are received by the server system 120. The location is a geospatial position of a mobile device. The identifier corresponds to the mobile device that sends the data 111 directly or indirectly to the server system 120. This information comprises the next observation point collected by the server system 120 from which the server system 120 builds the record of proximate landmarks for the mobile device.

In step 203, the location is mapped to a plurality of proximate landmarks by the mapper 121, for example, using the geo data from the GIS 112. One set of latitude and longitude coordinates may correspond to several proximate landmarks. For example, one measure of nearness is whether a landmark is located within a circle of a given radius having a center at the reported location of the mobile device. It is expected that the longer the radius used as the threshold for proximate distance is, the more landmarks will be identified as proximate by being located within the circle.

In step 204, the landmarks identified as proximate to the location reported by the mobile device are stored in association with the identifier corresponding to the mobile device. This enables a record to be built of what landmarks tend to be near the mobile device at various times. Through iterating steps 202-205, this enables the compilation of a frequency distribution of the geo features that tend to surround the mobile device.

In step 205, the server system 120 discards the received location data. The server system 120 does not maintain a record of latitude and longitude coordinates for the location observations reported to the server system 120. In this way, the privacy of users of the mobile devices is enhanced.

In step 206, the proximate landmarks are featurized by frequency. For example, the individual counts in various categories of landmarks that have been accumulated in the record corresponding to one mobile device are normalized by dividing the number of counts in the category (e.g., movie theater, school, coffee shop, etc.) by the total number of observations (i.e., location data points collected) of the mobile device. Alternatively, another normalization technique known to those of skill in the art may be used instead to process the raw counts by category into a frequency distribution. Featurizing the proximate landmarks by frequency generates a set of frequency features. A frequency feature expresses the frequency of observations of the mobile device proximate to a landmark within a category, such as 70% coffee shop, 30% beach, etc. The frequency features become features in the geo feature set from which geo model trainer 124 trains the geo model 140.

In step 207, the geo model 140 is trained for the campaign 130 using the featurized landmarks. The geo model trainer 124 attaches geo features from the records of the converters and non-converters and trains the model to identify the features that are most strongly correlated to the status of a converter or non-converter, respectively. Once training in complete, the geo model trainer 124 estimates the parameters used to construct the underlying model. In one example, the parameters are the weights of each feature corresponding to the importance of the feature in predicting the likelihood of conversion.

In step 208, the geo model 140 and the pixel model 170 are combined to generate the meta model 180. In one embodiment, the combiner 128 trains the meta model 180 to determine the respective weight to apply to each feature in the meta model 180.

In step 209, the meta model 180 is applied by the modeling server 190 to available advertising opportunities, for example, to target advertisements for display on a mobile device. The operation of the modeling server in using the meta model 180 to bid on advertisement opportunities for a mobile device is described below with reference to FIG. 3.

Figure 3:
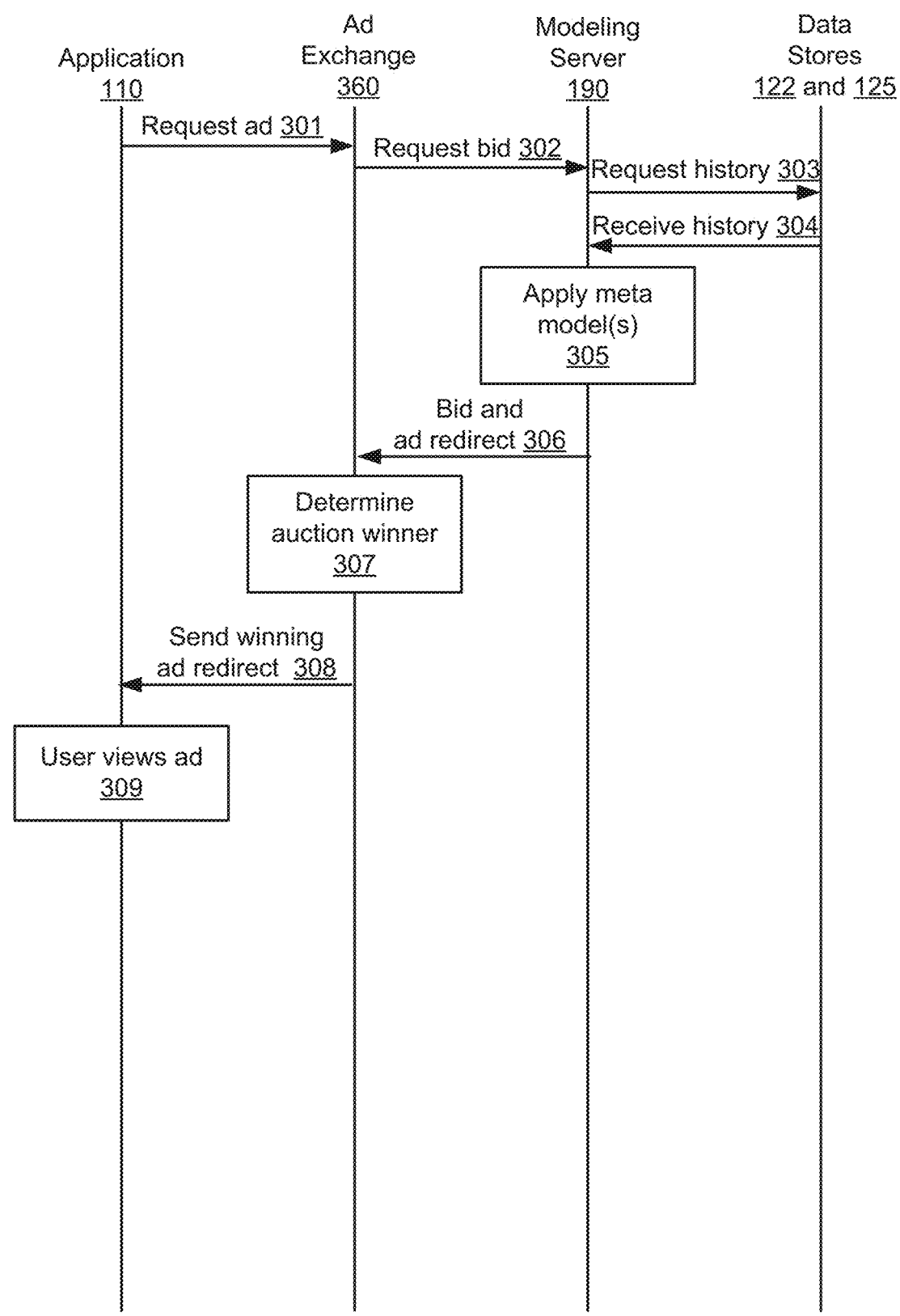
FIG. 3 is an interaction diagram illustrating applying a meta model to determine an amount to bid in an auction for an opportunity to display an ad on a mobile device, in accordance with an embodiment of the invention.

FIG. 3 is an interaction diagram illustrating applying a meta model to determine an amount to bid in an auction for an opportunity to display an ad on a mobile device, in accordance with an embodiment of the invention. It is noted that FIG. 3 is merely illustrating an example of a real-time bidding environment, and the interactions depicted in FIG. 3 may vary in other examples.

In the scenario illustrated in FIG. 3, as a user operates an application 110, for example a web browser that navigates to a publisher's website that includes ad slot to be auctioned in an ad exchange 360, the publisher's web server sends instructions to the application 110 for accessing content to be displayed, including a coded link known as an "ad tag" that points to an advertisement exchange 360. The application 110 uses the ad tag to contact the advertisement exchange 360 with a request for an ad in step 301.

The ad exchange 360 receives the request for the ad from the application 110 and reads the identifier. In response, the ad exchange 360 starts the auction in step 302 by sending a bid request to the modeling server 190 and to other servers to notify potential bidders of the bidding opportunity. Included with the bid request is the identifier and other data describing the bid opportunity, such as, for example, the URL on which the ad will be delivered, the topic of the webpage on which the ad will appear, site visit frequency, and/or the dimensions of the ad slot.

The modeling server 190 receives the request for the bid 302, and may match the identifier delivered from the ad exchange 360 to the modeling server's own corresponding identifier that is linked to a rich set of data, such as the consumption history and record of proximate landmarks. In one embodiment, to access the consumption history and record of proximate landmarks, the modeling server 190 requests it from the data store 122 and 125 in step 303 and receives it from the data stores 122 and 125 in step 304.

In step 305, an advertising targeting meta model 180 is applied to the consumption history and record of proximate landmarks associated with a mobile device to determine the value of an opportunity to display a campaign's advertisement on the mobile device. Depending on the implementation of the model 180, the input to the model are consumption history data and proximate landmark data, and the output of the model 180 may be a score, a percentage likelihood, a binary result, or other indication of whether the bid opportunity is valuable to the advertising campaign 130. In some cases, the indication of value output by the model 180 is then translated into a bid amount at the modeling server 190. In general, the higher score or percentage likelihood is, the higher the bid amount is.

If the bid opportunity is judged valuable, in step 306, the modeling server 190 submits to the ad exchange 360 a bid amount and an ad redirect to send to the application 110 should the bid win the auction. The ad redirect provides instructions for redirecting the application 110 to a server that will serve the ad for the advertising campaign that submitted the winning bid.

In step 307, the ad exchange 360 determines the auction winner from the submitted bids. In some implementations, the ad exchange 360 may send a notification to the winner and/or the other bidders. The notification may include an indication of whether the bidder won the auction, and may confirm the amount that the winner will be charged for buying the ad placement, which is some cases is the amount of the second highest bid.

In step 308, the ad exchange 360 sends the ad redirect included with the winning bid to the application 110. The application 110 uses the ad redirect to access the ad so that the user can view the ad in step 309.

If the advertisement successfully influences the user of the mobile device, then the user will eventually convert. As discussed above, the definition of conversion may differ between campaigns, but generally involves the user taking some desirable and observable action within a particular time frame. Depending on the definition of conversion, the conversion event need not occur immediately after viewing the ad, and may be offset in time from viewing the ad (e.g., by minutes, hours, days, etc.) and still be counted as a conversion provided that it occurs within the provided time frame, referred to as a conversion window. Subsequently, the signal of conversion can be directly or indirectly conveyed from the mobile device to the server system 120. The signal of conversion may include details of the conversion activity, but importantly, the server system 120 can use the newly received converter data to update the model for future advertisement targeting purposes.

In some implementations, the process illustrated in steps 301 through 309 of FIG. 3 can be executed in a fraction of a second. Ideally, the time passage between the application 110 requesting the ad in step 301 and the user viewing the ad in step 309 is short enough not to impact the user's enjoyment of the application 110 or content experienced through the application 110, such as a publisher's website that the user is browsing. In other words, there is no noticeable lag to download and display the appropriate ad of the winning bidder in the auction. The time period between the user viewing the ad in step 309 and an eventual conversion may be variable.

Lastly, if there are a plurality of models corresponding to the same ad campaign existing at various server systems 120, the models can be synchronized, for example by reconciling or combining the models, every few hours, or at the end of the day, or on another schedule, to prevent them from diverging too greatly from one another. The combination of models may be performed, for example, by averaging the models, or by taking a weighted average of the models based on the amount of converters recently incorporated into the models. The amount of converters experienced by individual server systems 120 may vary greatly, so the synchronization process ensure that all models are benefiting from recent improvements to the models, and none of the models become too stale.

Physical Components of a Computer

Figure 5:
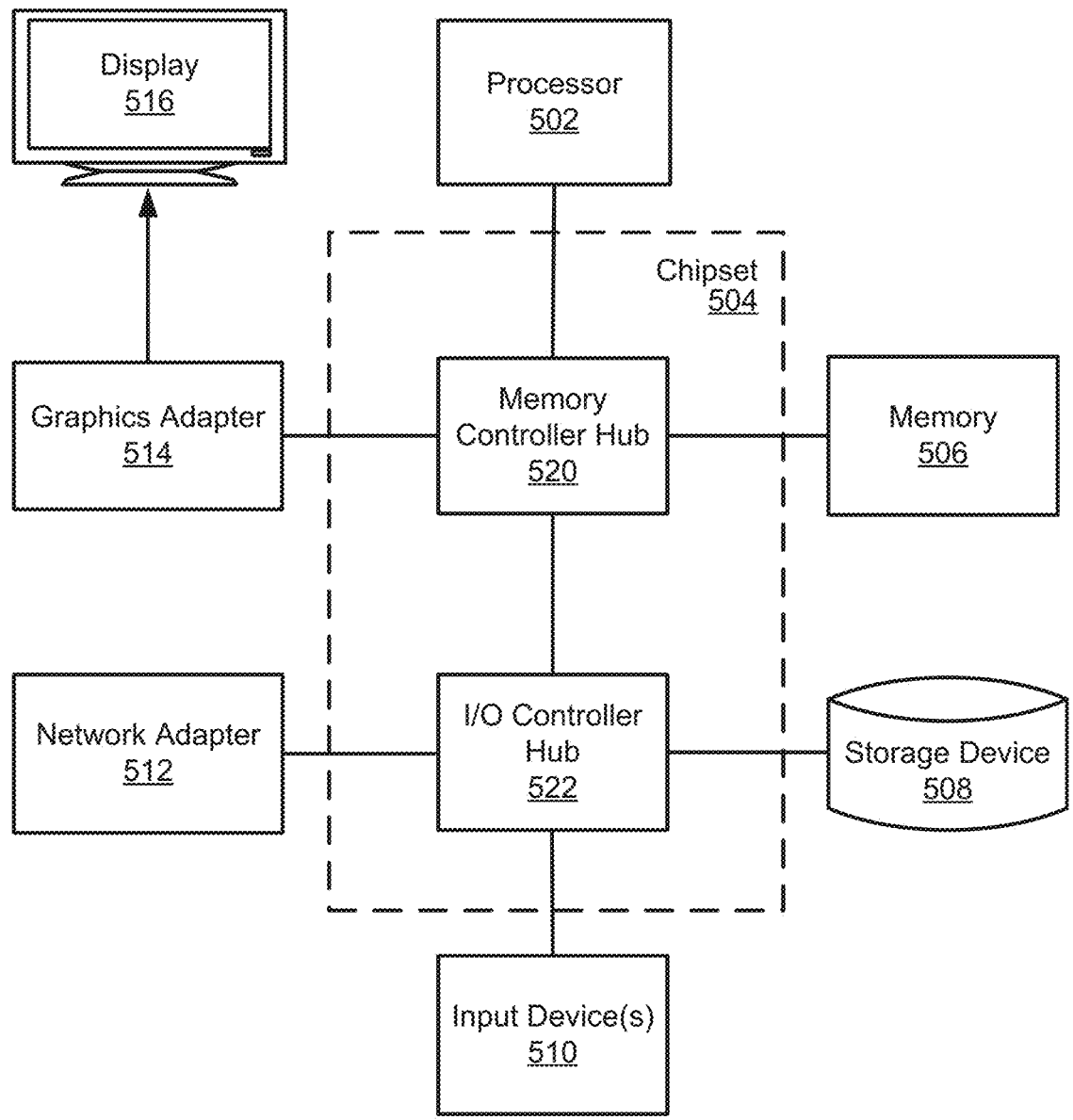
FIG. 5 is a high-level block diagram of the components of a computing system for use, for example, as a server system depicted in FIG. 1, in accordance with an embodiment of the invention.

FIG. 5 is a high-level block diagram of the components of a computing system 500 for use, for example, as a server system 120 depicted in FIG. 1, in accordance with an embodiment. Illustrated are at least one processor 502 coupled to a chipset 504. Also coupled to the chipset 504 are a memory 506, a storage device 508, input device(s) 510, a network adapter 512, and a graphics adapter 514. A display 516 is coupled to the graphics adapter 514. In one embodiment, the functionality of the chipset 504 is provided by a memory controller hub 520 and an I/O controller hub 522. In another embodiment, the memory 506 is coupled directly to the processor 502 instead of the chipset 504.

The processor 502 is the hardware logic circuitry of the computer 500 that processes instructions such as computer programs to operate on data. The memory 506 holds instructions and data used by the processor 502. The storage device 508 is any non-transitory computer-readable storage medium, such as a hard drive, compact disk read-only memory (CD-ROM), DVD, or a solid-state memory device. The input devices(s) 510 may be a keyboard, mouse, track ball, touch-sensitive screen and/or another type of pointing device to input data into the computer 500. The network adapter 512 couples the computer 400 to a network. The graphics adapter 514 displays images and other information on the display 516.

As is known in the art, a computer 500 can have different and/or other components than those shown in FIG. 5. In addition, the computer 500 can lack certain illustrated components. In one embodiment, a computer 500 acting as a server may lack an input device 510, a graphics adapter 514, and/or a display 516. Moreover, the storage device 508 can be local and/or remote from the computer 500 (such as embodied within a storage area network (SAN)).

As is known in the art, the computer 500 is adapted to execute computer program modules for providing the functionality described herein. As used herein, the term "module" refers to computer program logic utilized to provide the specified functionality. Thus, a module can be implemented in hardware, firmware, and/or software. In one embodiment, program modules are stored on the storage device 508, loaded into the memory 506, and executed by the processor 502. The functionality attributed to the modules can be performed by other or different modules in other embodiments. Moreover, this description occasionally omits the term "module" for purposes of clarity and convenience.

Additional Configuration Considerations

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times to refer to these arrangements of functional operations as modules, without loss of generality. The described operations and their associated modules may be embodied in software, firmware, hardware, or any combinations thereof.

The disclosed embodiments also relate to an apparatus for performing the operations described herein. This apparatus may be specially constructed for the required purposes, or it may comprise a general-purpose computer selectively activated or reconfigured by a computer program stored on a computer-readable medium that can be accessed by the computer. Such a computer program may be stored in a computer-readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in this disclosure may include a single processor or may be architectures employing multiple processor designs for increased computing capability.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. In addition, use of the "a" or "an" are employed to describe elements and components of the embodiments herein. This is done merely for convenience. This description should be read to include one or at least one and the singular also includes the plural unless it is obvious that it is meant otherwise.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or"

refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs of the disclosed embodiments and applications. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the disclosed embodiments without departing from the spirit and scope of the invention as defined in the appended claims.

What is claimed is:

1. A method comprising:
   generating, by a server, a meta model, comprising:
      for each of a plurality of mobile devices, for each of a plurality of locations:
         receiving a location and an identifier corresponding to a respective mobile device;
         mapping the location to a plurality of proximate landmarks;
         storing the proximate landmarks in association with the identifier; and
         discarding the received location;
      featurizing the plurality of proximate landmarks by frequency to generate a set of frequency features;
      training a geo model for a campaign using the frequency features; and
      combining the geo model with a pixel model to generate a meta model; and
   automatically generating, by the server, a response to a bid request, comprising:
      receiving, from an ad exchange, the bid request and a target identifier corresponding to an advertising opportunity;
      receiving a consumption history and record of proximate landmarks associated with the target identifier; and
      applying the meta model to the consumption history and record of proximate landmarks associated with the target identifier to determine a value of the advertising opportunity to an advertising campaign;
      returning, to the ad exchange, a bid amount based on the determined value;
      wherein the time passage between receiving the bid request and returning the bid amount is a fraction of a second.

2. The method of claim 1, wherein the proximate landmarks comprise categories of businesses.

3. The method of claim 1, wherein featurizing the plurality of proximate landmarks by frequency further comprises, for each landmark category, dividing a count in the respective landmark category by a total number of observations of a location of the mobile device.

4. The method of claim 1, wherein training the geo model further comprises training the geo model to identify geo features that are most strongly correlated to a status of converter or non-converter, respectively.

5. The method of claim 1, wherein combining the geo model with the pixel model comprises training the meta model to determine the respective weight to apply to each feature in the meta model.

6. The method of claim 1, wherein returning the bid amount further comprises sending an ad redirect to an ad exchange.

7. A non-transitory computer-readable storage medium executing computer program instructions, the computer program instructions comprising instructions for:
   generating, by a server, a meta model, comprising:
      for each of a plurality of mobile devices, for each of a plurality of locations:
         receiving a location and an identifier corresponding to a respective mobile device;
         mapping the location to a plurality of proximate landmarks;
         storing the proximate landmarks in association with the identifier; and
         discarding the received location;
      featurizing the plurality of proximate landmarks by frequency to generate a set of frequency features;
      training a geo model for a campaign using the frequency features; and
      combining the geo model with a pixel model to generate a meta model; and
   automatically generating, by the server, a response to a bid request, comprising:
      receiving, from an ad exchange, the bid request and a target identifier corresponding to an advertising opportunity;
      receiving a consumption history and record of proximate landmarks associated with the target identifier; and
      applying the meta model to the consumption history and record of proximate landmarks associated with the target identifier to determine a value of the advertising opportunity to an advertising campaign;
      returning, to the ad exchange, a bid amount based on the determined value;
      wherein the time passage between receiving the bid request and returning the bid amount is a fraction of a second.

8. The medium of claim 7, wherein the proximate landmarks comprise categories of businesses.

9. The medium of claim 7, wherein the instructions for featurizing the plurality of proximate landmarks by frequency further comprise instructions for dividing, for each landmark category, a count in the respective landmark category by a total number of observations of a location of the mobile device.

10. The medium of claim 7, wherein the instructions for training the geo model further comprise instructions for training the geo model to identify geo features that are most strongly correlated to a status of converter or non-converter, respectively.

11. The medium of claim 7, wherein the instructions for combining the geo model with the pixel model further comprise instructions for training the meta model to determine the respective weight to apply to each feature in the meta model.

12. The medium of claim 7, wherein returning the bid amount further comprises sending an ad redirect to an ad exchange.

13. A system comprising:
   a processor;
   a computer-readable storage medium storing processor-executable computer program instructions, the instructions comprising instructions for:
      generating, by a server, a meta model, comprising:

for each of a plurality of mobile devices, for each of a plurality of locations:
  receiving a location and an identifier corresponding to a respective mobile device;
  mapping the location to a plurality of proximate landmarks;
  storing the proximate landmarks in association with the identifier; and
  discarding the received location;
featurizing the plurality of proximate landmarks by frequency to generate a set of frequency features;
training a geo model for a campaign using the frequency features; and
combining the geo model with a pixel model to generate a meta model; and
automatically generating, by the server, a response to a bid request, comprising:
  receiving, from an ad exchange, the bid request and a target identifier corresponding to an advertising opportunity;
  receiving a consumption history and record of proximate landmarks associated with the target identifier; and
  applying the meta model to the consumption history and record of proximate landmarks associated with the target identifier to determine a value of the advertising opportunity to an advertising campaign;
  returning, to the ad exchange, a bid amount based on the determined value;
  wherein the time passage between receiving the bid request and returning the bid amount is a fraction of a second.

14. The system of claim 13, wherein the proximate landmarks comprise categories of businesses.

15. The system of claim 13, wherein the instructions for featurizing the plurality of proximate landmarks by frequency further comprise instructions for dividing, for each landmark category, a count in the respective landmark category by a total number of observations of a location of the mobile device.

16. The system of claim 13, wherein the instructions for training the geo model further comprise instructions for training the geo model to identify geo features that are most strongly correlated to a status of converter or non-converter, respectively.

17. The system of claim 13, wherein the instructions for combining the geo model with the pixel model further comprise instructions for training the meta model to determine the respective weight to apply to each feature in the meta model.

18. The system of claim 13, wherein returning the bid amount further comprises sending an ad redirect to an ad exchange.

* * * * *